US 8,297,535 B1

(12) United States Patent
Reid (10) Patent No.: US 8,297,535 B1
(45) Date of Patent: Oct. 30, 2012

(54) IN-LINE FERTILIZING AND LAWN CARE DISPENSING SYSTEM

(76) Inventor: Ezekiel T. Reid, Fort Lauderdale, FL (US)

( * ) Notice: Subject to any disclaimer, the term of this patent is extended or adjusted under 35 U.S.C. 154(b) by 638 days.

(21) Appl. No.: 12/454,979

(22) Filed: May 27, 2009

Related U.S. Application Data

(60) Provisional application No. 61/128,661, filed on May 27, 2008.

(51) Int. Cl.
*A62C 5/02* (2006.01)
*B05B 7/26* (2006.01)

(52) U.S. Cl. ........ 239/310; 239/313; 239/316; 239/302; 137/268

(58) Field of Classification Search ............ 239/310, 239/313, 316, 302; 137/268
See application file for complete search history.

(56) References Cited

U.S. PATENT DOCUMENTS

| 4,099,267 | A | | 7/1978 | King |
| 5,251,656 | A | * | 10/1993 | Sexton, Sr. ............... 137/1 |
| 5,666,987 | A | | 9/1997 | Combs |
| 5,699,827 | A | | 12/1997 | Delorme et al. |
| 5,775,593 | A | | 7/1998 | Delorme et al. |
| 5,829,873 | A | | 11/1998 | King |
| 6,173,732 | B1 | * | 1/2001 | Davis et al. ............... 137/377 |
| 6,264,119 | B1 | * | 7/2001 | Truong ..................... 239/310 |
| 6,979,116 | B2 | | 12/2005 | Cecala et al. |
| 7,090,391 | B2 | | 8/2006 | Taniguchi |

* cited by examiner

*Primary Examiner* — Dinh Q Nguyen
(74) *Attorney, Agent, or Firm* — Montgomery Patent & Design, LLC; Robert C. Montgomery; Joseph Yaksich (57) ABSTRACT

An apparatus that provides automatic mixing and distribution of granular or liquid fertilizers through an underground or portable sprinkler system, comprising a mixing container connected in-line with the sprinkler system's water delivery line or a regular garden hose connected to a portable or movable sprinkler, is herein disclosed. This mixing container provides a large lower portion which is accessed through a sealed and latched cover portion, through which granular-based lawn care chemicals are added. Incoming water then dissolves and mixes the chemicals, passes through removable filter media and exits the apparatus. This outgoing water is then routed to an underground sprinkler system or a portable hose-based sprinkler. A bottom valve can be opened to drain the apparatus and allow for cleaning. Additionally, the apparatus comprises an integral liquid fertilizer receptacle to automatically mix the incoming water with various liquid lawn care chemicals. Finally, the apparatus provides internal filtration to remove particulate matter therefrom the created fertilizer solution. The apparatus may be utilized at a header supply portion of a sprinkler system, part of an underground system, or connected inline between two garden hoses or a spigot.

11 Claims, 4 Drawing Sheets

IN-LINE FERTILIZING AND LAWN CARE DISPENSING SYSTEM

RELATED APPLICATIONS

The present invention was first described in and claims the benefit of U.S. Provisional Application No. 61/128,661, filed May 27, 2008, the entire disclosures of which are incorporated herein by reference.

FIELD OF THE INVENTION

The present invention relates generally to fertilizer distribution systems for lawns and, more particularly, to an in-line fertilizing and lawn care chemical dispensing system.

BACKGROUND OF THE INVENTION

There are various tasks that one can perform in order to enhance the growth and beauty of a lawn, a garden or other landscape. Among the most common and effective is irrigation in combination with the routine application of fertilizers and insecticides. Although various hose connected sprinklers and automatic underground sprinkler systems permit unattended watering of lawns, a great deal of time is usually consumed by manually monitoring and applying granular or liquid-based fertilizers and insecticides whether by use of a spreader or a hand-held hosed-based system.

Various attempts have been made in the past to overcome this problem and provide a means of lawn chemical dispersion and treatment. These attempts can be seen by reference to several U.S. patents, including U.S. Pat. Nos. 5,699,827 and 5,775,593, issued in the name of Delorme et al., which describe a lawn treatment apparatus for an underground sprinkler system and an automatic lawn treatment dispensing unit respectively; 5,666,987, issued in the name of Combs, which describes a chemical dispersing apparatus; and 6,173,732, issued in the name of Davis et al., which describes a fertilizer system. Other attempts to provide a means to mix granular or liquid chemical with water include U.S. Pat. Nos. 5,829,873 and 4,099,267, issued in the name of King, which both describe an apparatus for mixing granular fertilizer or lawn treatment liquid in water; 6,979,116, issued in the name of Cecala et al., which describes an apparatus for injecting dry bulk amendments for water and soil treatment; and 7,090,391, issued in the name of Taniguchi, which describes an apparatus and method for mixing by agitation in a multichambered mixing apparatus including a pre-agitation mixing chamber.

While these devices fulfill their respective, particular objectives, each of these references suffers from one (1) or more deficiencies and disadvantages by failing to provide a means to simply and effectively chemical treat a lawn or garden. Accordingly, there is a need for a means by which one can apply fertilizer or insecticides evenly and effectively without spending a great deal of time. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to practically and automatically mix either granular or liquid chemical lawn treatment with an amount of source water, which can be simply combined to various standard sprinkler systems to provide regular watering and lawn beautification and as such, the object of the present invention is to solve the aforementioned disadvantages.

To achieve the above objectives, it is an object of the present invention to provide an in-line fertilizing and lawn care dispensing system that provides an automatic means of mixing granular or liquid fertilizers with water and distributing that solution to an underground or portable sprinkler system.

Another object of the in-line fertilizing and lawn care dispensing system is to provide an apparatus comprising a mixing chamber connected in-line to a water delivery line portion of a sprinkler system or a regular garden hose having a portable-type sprinkler. A large body portion receives an amount of granulated fertilizer and is accessed through a top-mounted sealed cover. Alternatively, a liquid chemical receptacle with a cap contains and introduces a flow of liquid fertilizer to the water supply. The inlet water source mixes and dissolves the fertilizer chemicals and passes through a replaceable filter element. A flow of water-fertilizer solution exits through an outlet pipe passing into the sprinkler system. A drain valve provides a means to drain the body for cleaning.

Yet still another object of the in-line fertilizing and lawn care dispensing system is to provide an apparatus comprising a body, a upper body collar, a lower body collar, a cover, a filter, a maximum fill line, a maximum fill line indicia, an inlet orifice, a first union, a tee fitting, a plurality of inlet piping sections, a safety shield, an outlet piping, a second union, an outlet orifice, a tee fitting, a inlet valve, a liquid chemical receptacle, and a liquid chemical cap and provides an in-line plumbing means between a water source and a sprinkler system, which are connected to the inlet orifice and the outlet orifice respectively.

Yet another object of the in-line fertilizing and lawn care dispensing system is to provide a body comprising a transparent or translucent composition that provides visual means of indicating the level of granulated fertilizer contained within and a maximum fill line and corresponding indicia defining the level of contained granulated fertilizer during filling.

Yet still another object of the in-line fertilizing and lawn care dispensing system is to provide a first and second unions that provide a "quick-connect" means for easily connecting to and disconnecting from a water source and a sprinkler system.

Yet another object of the in-line fertilizing and lawn care dispensing system is to provide an inlet valve that enables a flow of liquid fertilizer to mix with the inlet water source, thereby regulating the volumetric flow of the liquid fertilizer from the liquid chemical receptacle that is mixed with the water source.

Yet still another object of the in-line fertilizing and lawn care dispensing system is to provide an apparatus comprising a filter restraint, a plurality of cover latches, a plurality of latching features, a filter element, and a filter gasket. The filter element provides a fluid filtering means to the fertilizer solution in order to remove any particulate matter and a mechanical retention means to the contained volume of granulated fertilizer within the body.

Yet still another object of the in-line fertilizing and lawn care dispensing system is to provide a drain valve and a removable lower access plug that provide a means to drain, clean, and maintain the apparatus.

Yet still another object of the in-line fertilizing and lawn care dispensing system is to provide a method of utilizing the device that provides for almost carefree lawn and garden maintenance in a manner which is quick, easy and effective.

Further objects and advantages of the in-line fertilizing and lawn care dispensing system will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols and in which:

FIG. 4*a* is a partial cut-away view of a body portion 20 of the in-line fertilizing and lawn care dispensing system 10, according to a preferred embodiment of the present invention; and, FIG. 4*b* is a close-up view of an attachment of a filter restraint portion 30 of the in-line fertilizing and lawn care dispensing system 10, according to a preferred embodiment of the present invention.

| DESCRIPTIVE KEY | |
|---|---|
| 10 | in-line fertilizing and lawn care dispensing system |
| 20 | body |
| 22 | upper body collar |
| 24 | lower body collar |
| 25 | female threaded region |
| 26 | filter support feature |
| 28 | cover |
| 30 | filter restraint |
| 31 | restraint flange |
| 32 | fastener |
| 34 | cover latch |
| 35 | latching feature |
| 36 | cover gasket |
| 38 | access plug |
| 40 | access plug socket |
| 42 | male threaded region |
| 50 | filter element |
| 51 | filter gasket |
| 53 | filter aperture |
| 54 | maximum fill line |
| 56 | maximum fill line indicia |
| 58 | inlet piping |
| 70 | outlet piping |
| 72 | first union |
| 74 | second union |
| 76 | elbow fitting |
| 78 | tee fitting |
| 80 | inlet valve |
| 82 | drain valve |
| 84 | pipe support |
| 86 | safety shield |
| 100 | liquid chemical receptacle |
| 102 | liquid chemical cap |
| 120 | inlet orifice |
| 122 | outlet orifice |
| 124 | drain orifice |
| 150 | water source |
| 160 | sprinkler system |
| 170 | granulated fertilizer |
| 175 | liquid fertilizer |

DETAILED DESCRIPTION OF THE PREFERRED EMBODIMENT

The best mode for carrying out the invention is presented in terms of its preferred embodiment, herein depicted within FIGS. 1 through 4*b*. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an in-line fertilizing and lawn care dispensing system (herein described as the "apparatus") 10, which provides a means for automatic mixing and distributing of water and granular or liquid fertilizers, thereby producing a solution which may be subsequently supplied thereto an underground or portable sprinkler system 160. The apparatus 10 comprises a mixing chamber connected in-line therewith a water delivery line portion of a sprinkler system 160, or alternately thereto a regular garden hose and a portable-type sprinkler. The apparatus 10 further comprises a large body portion 20 which is accessed through a top-mounted sealed cover 28, wherein granulated fertilizer 170 are added thereinto. Additionally, the apparatus 10 comprises a reservoir which introduces a flow of liquid fertilizer chemical 175 thereto said water supply 150. The fresh water source 150 mixes and dissolves the fertilizer chemicals; passes through a replaceable filter element 50 and produces a flow of fertilizer solution which exits the apparatus 10 passing subsequently thereinto the sprinkler system 160. Furthermore, a drain valve 82 is provided to drain the apparatus 10 for cleaning. The apparatus 10 can be used with liquid lawn care chemicals 175 with or without installation of the aforementioned filter element 50 based upon particular applications. It is further envisioned that the apparatus 10 may also be utilized thereat a header supply portion of a fertilizing system which provides output distribution of fertilizer solution thereto a plurality of above-ground or underground sprinkler head zones.

Figure 1:
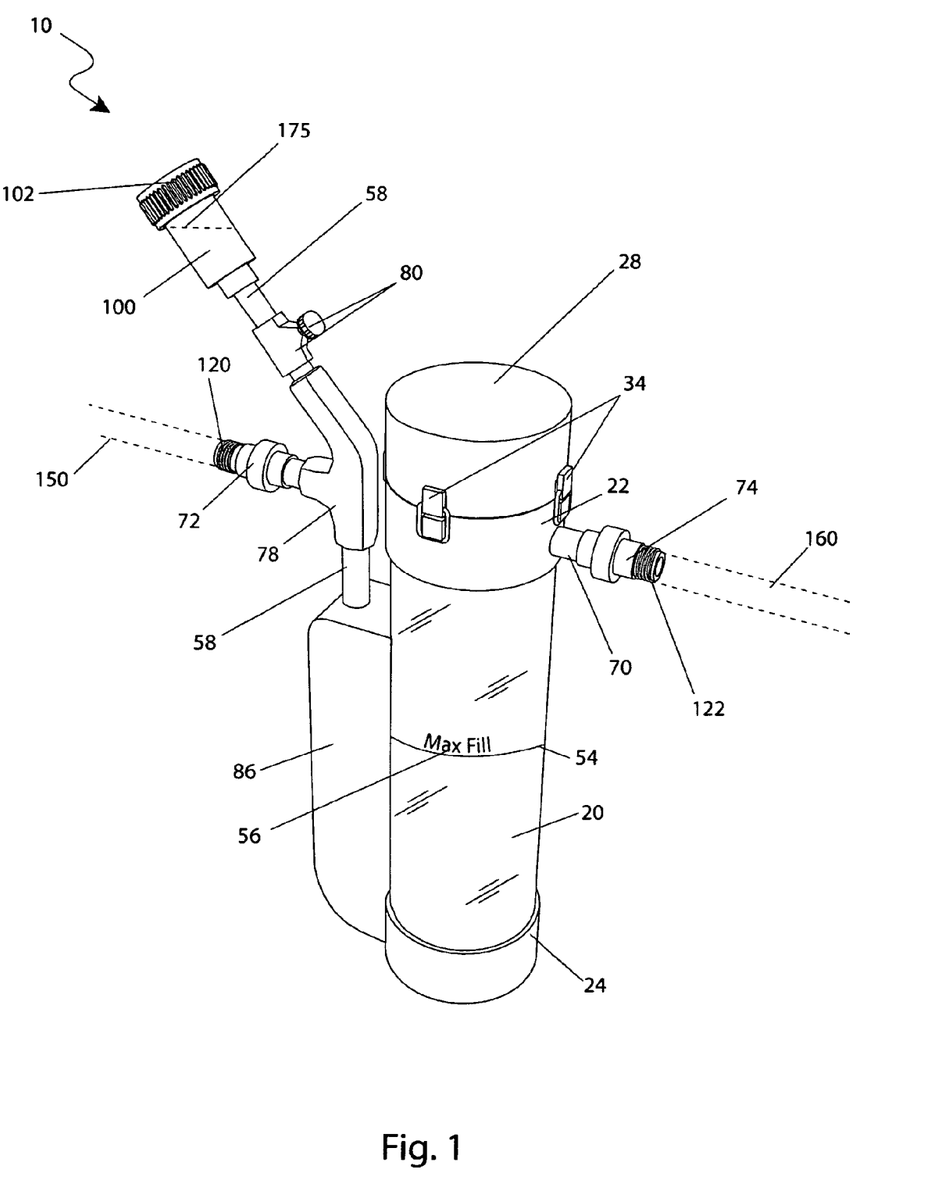
FIG. 1 is a perspective view of an in-line fertilizing and lawn care dispensing system 10, according to a preferred embodiment of the present invention.

Referring now to FIG. 1, a perspective view of the apparatus 10, according to a preferred embodiment of the present invention, is disclosed. The apparatus 10 comprises a body 20, a upper body collar 22, a lower body collar 24, a cover 28, a maximum fill line 54, a maximum fill line indicia 56, an inlet orifice 120, a first union 72, a tee fitting 78, a plurality of inlet piping sections 58, an outlet piping 70, a second union 74, an outlet orifice 122, a tee fitting 78, a inlet valve 80, a liquid chemical receptacle 100, and a liquid chemical cap 102. The apparatus 10 provides an in-line plumbing means therewith a water source 150 and a sprinkler system 160 being connected thereto the inlet orifice 120 and the outlet orifice 122, respectively, each comprising standard threaded portions enabling easy attachment thereto a conventional garden hose or subsequent hard piping fittings, based upon particular installations and applications thereof.

The upper body collar 22 and the lower body collar 24 comprise cylindrical reinforced sections preferably being integrally-molded portions of said body 20; however said upper 22 and lower 24 body collars may also be affixed thereto said body 20 using common PVC joining adhesives. The body 20, upper body collar 22, lower body collar 24, filter support feature 26, cover 28, and filter restraint 30 are preferably made using polyvinylchloride (PVC); however, equivalent materials may be used such as, but not limited to: chlorinated polyvinylchloride (CPVC), acrylonitrile butadiene styrene (ABS), polypropylene, stainless steel, or the like, and as such should not be interpreted as a limiting factor of the apparatus 10. The body 20 is envisioned to be molded using a transparent or translucent composition, thereby providing visibility thereto a level of granulated fertilizer 170 contained therewithin. The body 20 further comprises a maximum fill line 54 and corresponding indicia 56 defining a level of contained granulated fertilizer 170 during filling. Said fill line 54 and indicia 56 are envisioned to be molded thereinto or painted thereupon the outer surface of the body 20.

The first 72 and second 74 unions provide a "quick-connect" means, thereby allowing timely connection and disconnection therefrom the water source 150 and sprinkler system 160, respectively. The inlet 58 and outlet 70 piping, the first 72 and second 74 unions, the elbow fitting 76, and the tee fitting 78, are envisioned to be standard commercially available plumbing components preferably made of PVC; however, equivalent materials may be provided such as ABS, polypropylene, or the like. The aforementioned plumbing parts are also envisioned to be preferably assembled theretogether using conventional PVC adhesive cement joining means; however, other plumbing materials and joining methods may be utilized without deviating from the concept such as, but not limited to: brazing, soldering, welding, or threaded portions.

It is further understood by those skilled in the art that the apparatus 10 may comprise of custom molded or fabricated parts designed to combine or consolidate a plurality of the aforementioned standard piping, fittings, and plumbing components, thereby possibly reducing manufacturing costs. Furthermore, it is also understood that said standard piping, fittings, and plumbing components may be molded or formed integrally thereinto portions of the apparatus 10 such as the walls of the body 20, the upper body collar 22, and the lower body collar 22, thereby providing possible additional consolidation of said piece parts.

The apparatus 10 further comprises a liquid chemical receptacle 100 comprising a threadingly removably attached liquid chemical cap 102. The liquid chemical receptacle 100 and the liquid chemical cap 102 comprise a capped cylindrical reservoir which provides a means to introduce a flow of liquid fertilizer 175 therefrom a bottom opening thereinto the water source flow 150, thereby providing a solution thereof. The inlet valve 80 works in conjunction therewith said flow of liquid fertilizer 175, thereby regulating a volumetric flow of said liquid fertilizer 175 therefrom said liquid chemical receptacle 100 being subsequently mixed therewith the water source 150. The liquid chemical receptacle 100 provides a threadingly removable means thereto the liquid chemical cap 102 along a top perimeter edge. The liquid chemical receptacle 100 is in fluid communication therewith a subjacent tee fitting 78 which facilitates mixture of, and delivery of, said water and liquid fertilizer 175 solution thereto the body portion 20 of the apparatus 10 via inlet piping 58 (see FIG. 4a). The liquid chemical receptacle 100 and the liquid chemical cap 102 are preferably made using molded polycarbonate, PVC, or equivalent materials.

Figure 2:
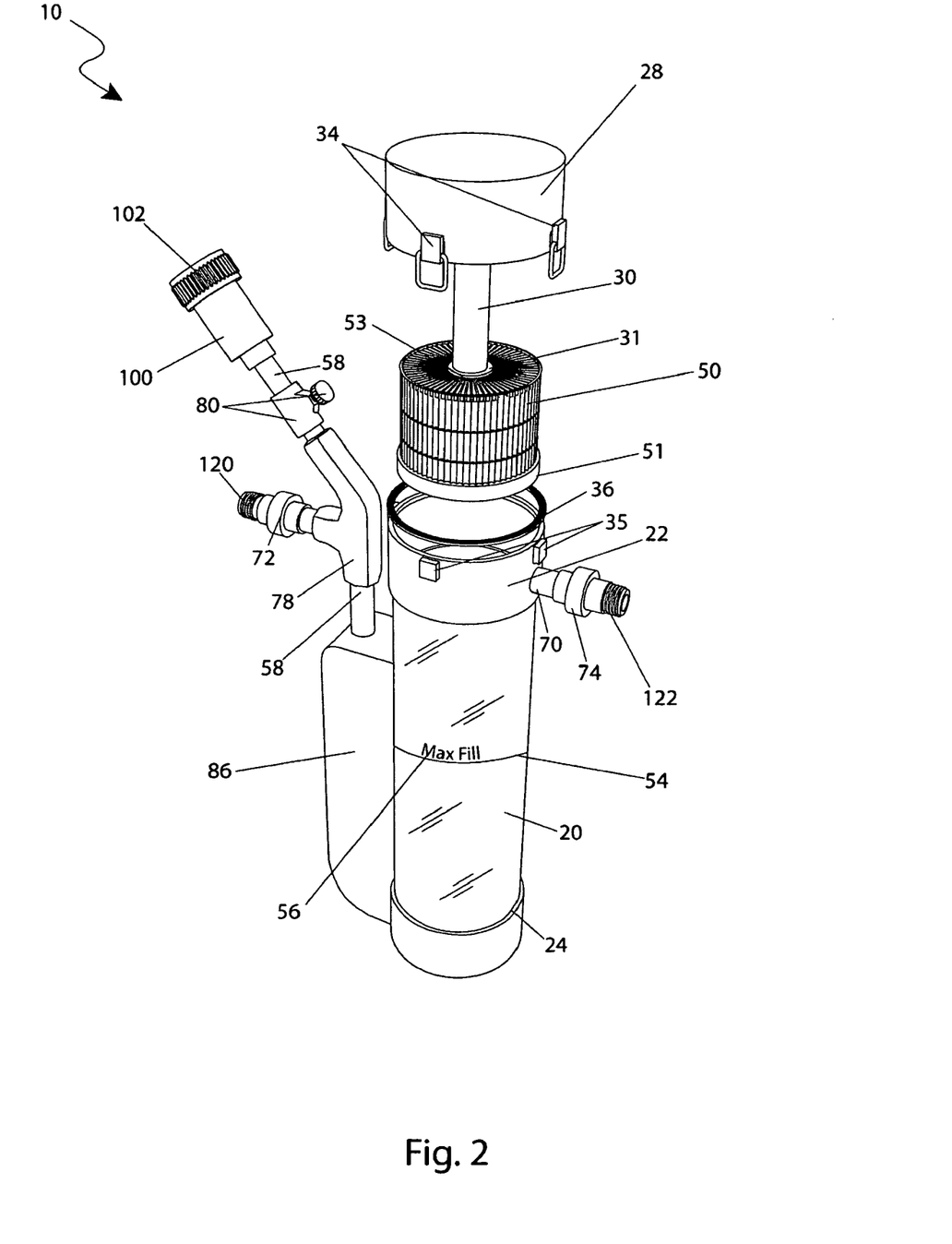
FIG. 2 is an exploded view of an in-line fertilizing and lawn care dispensing system 10 depicting a filter element portion 50, according to a preferred embodiment of the present invention.

Referring now to FIG. 2, an exploded view of the apparatus 10 depicting a filter element portion 50, according to a preferred embodiment of the present invention, is disclosed. The apparatus 10 comprises an upper body collar 22, a cover 28, a filter restraint 30, four (4) cover latches 34, four (4) latching features 35, a filter element 50, and a filter gasket 51.

The cover 28 provides an access means thereto an interior space of the apparatus 10 as well as thereto the filter element 50 via a sealed connection therewith the upper body collar 22. The upper body collar 22 is envisioned to have a molded step feature providing a gasket surface therealong an open end portion thereof to receive a circular cover gasket 36 therearound which preferably comprises a rectangular cross-section. The cover gasket 36 provides an effective sealing of the cover 28 thereto the apparatus 10. Said open end portion of the upper body collar 22 provides a slip-fit attachment being inserted therewithin an open end of the cylindrical cover 28, thereby capturing said cover gasket 36 therebetween the cover 28 and the upper body collar 22 (see FIG. 4a).

The apparatus 10 comprises a filter element 50 which provides fluid filtering of a fertilizer solution to remove any particulate matter therefrom and acts as a mechanical retention means thereto a contained volume of granulated fertilizer 170 therewithin the body 20. The filter element 50 comprises a cylindrical-shaped unit having closed end portions. The filter element 50 further comprises a filter gasket 51 affixed thereto a lower perimeter edge being molded thereto or affixed thereto using adhesives, thereby directing a flow of produced fertilizer/water solution therewithin the body 20 therethrough said filter element 50 in an expected manner. The filter element 50 is to be replaceable and is envisioned to be introduced in a variety of common media types such as woven mesh, micronic, porous metal, fan-fold fiber sheet, magnetic type, or the like. The filter element 50 may also be lined along an outside surface using fabricated metal sheet, stainless steel (mesh), polypropylene, nylon, or the like, to support the previously described filtering media portion.

Figures 4A, 4B:
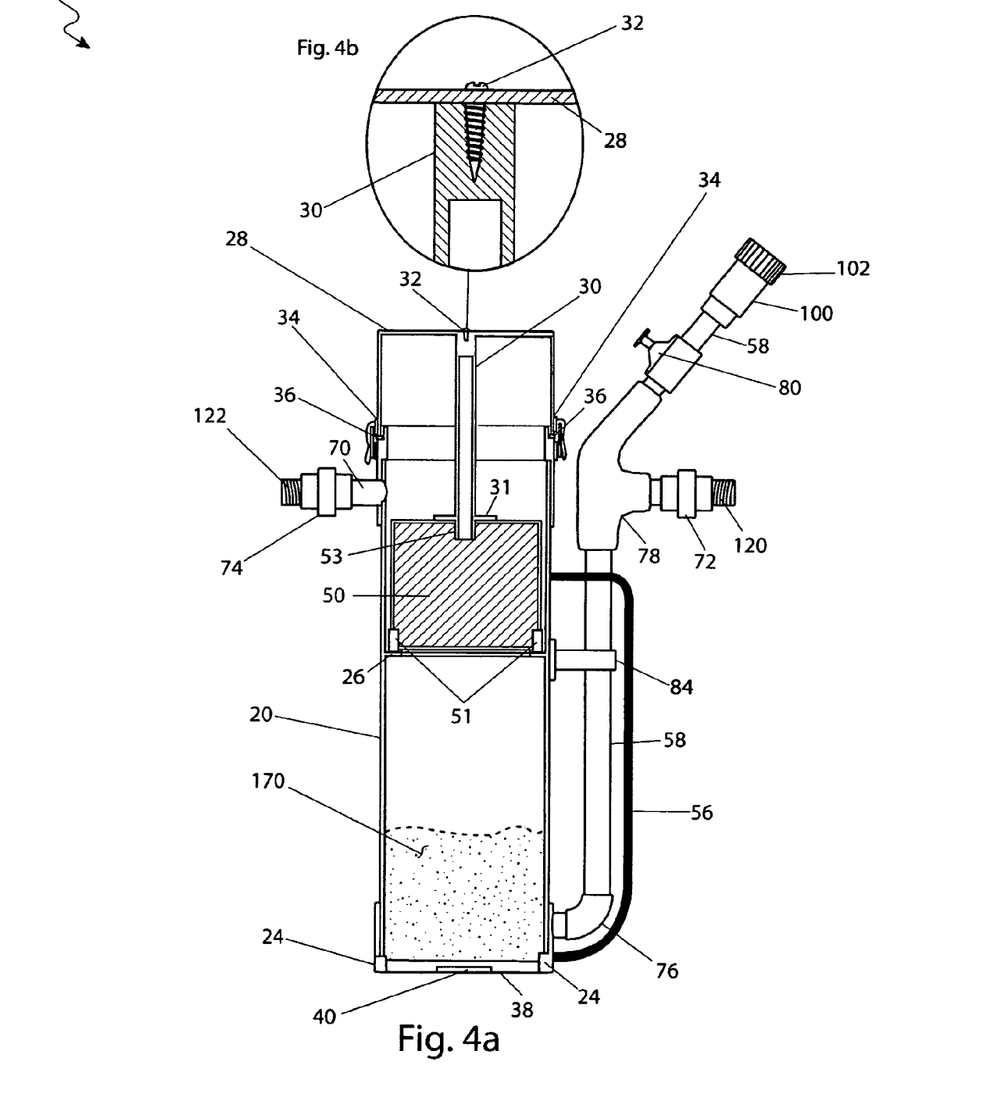

The cover 28 comprises a filter restraint tube 30 which provides a removable attachment thereto the filter 50 (see FIGS. 4a and 4b). The filter restraint 30 comprises a downwardly extending tubular shape further comprising an integral molded restraint flange feature 31 which provides vertical positioning of said filter element 50. The restraint flange 31 comprises a horizontal circular disc located approximately one (1) inch from a bottom end portion of said filter restraint 30. The filter restraint 30 further provides a friction-fit attachment means thereto the filter element 50 via insertion of a lower end portion of the filter restraint 30 thereinto a centrally located filter aperture 53 portion of the filter element 50 being located centrally along a top surface of the filter element 50. Said restraint flange 31 and filter aperture 53 act to retain the filter element 50 thereto the filter restraint 30 as well as providing slight compression of the filter gasket portion 31 of the filter element 50 thereagainst a filter support feature 26, thereby holding the filter element 50 securely during use (see FIG. 4a).

The cover 28 is securely affixed thereto the upper body collar 22 via a plurality of cover latches 34. The cover latches 34 comprise commonly available snap latches being affixed thereto the cover 28 via molded features and are arranged in an equally-spaced manner along a lower perimeter edge of said cover 28. The cover latches 34 are preferably comprised of corrosion-resistant materials such as brass, stainless steel, and the like. A hook portion of each cover latch 34 is utilized to secure the cover 28 thereto the upper body collar 22 being attached thereto corresponding integrally-molded latching features 35 comprising rectangular-shaped protrusions along an outer surface of said upper body collar 22. The cover latches 34 are utilized to removably attach the cover 28, thereby gaining access thereto the filter element 50 while providing compression of the cover gasket 36.

The cover gasket 36 and the filter gasket 51 are envisioned being made using effective liquid sealing materials such as rubber, TEFLON®, nylon, or the like.

Figure 3:
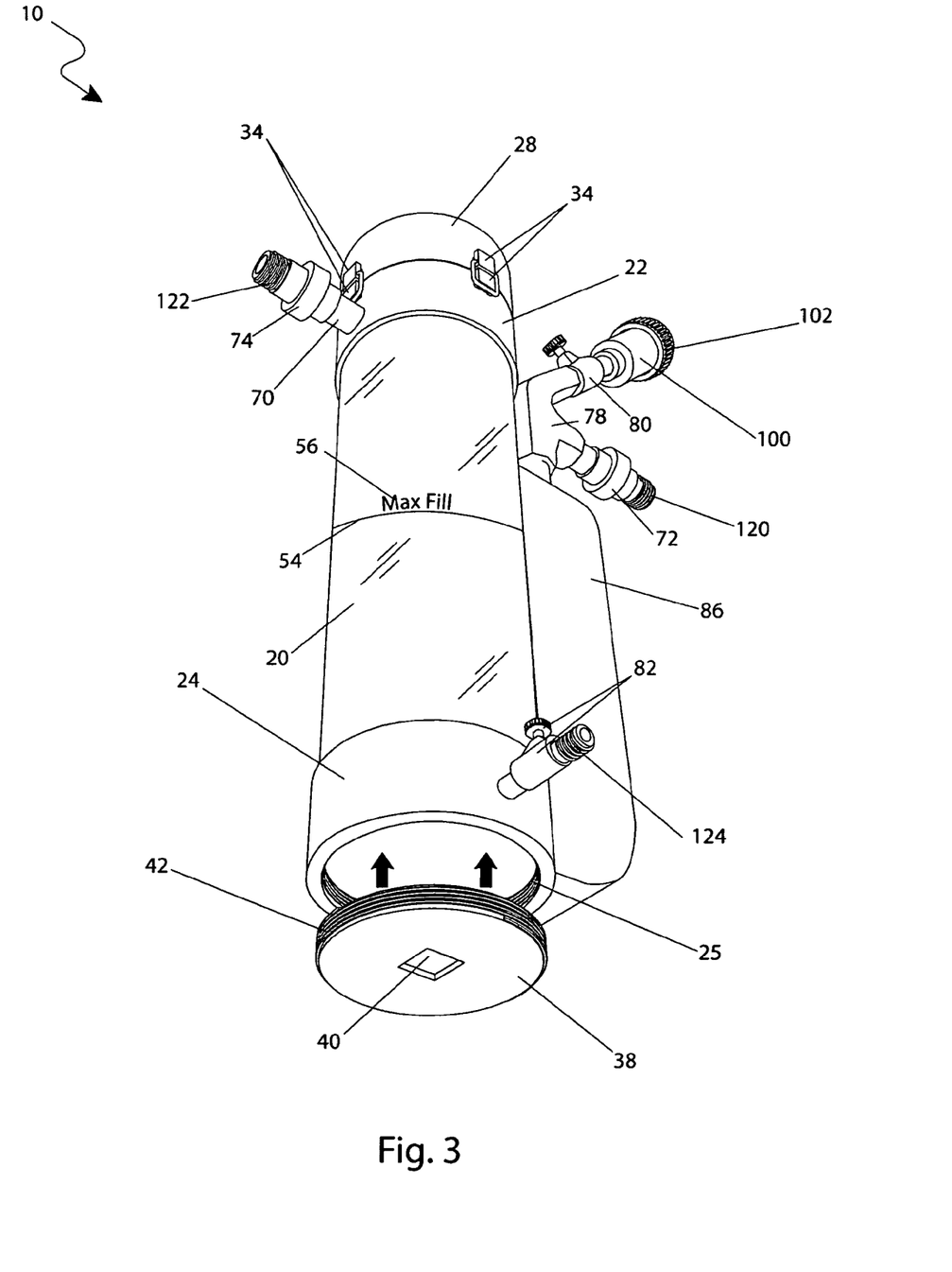
FIG. 3 is an upward looking view of an in-line fertilizing and lawn care dispensing system 10 depicting an access plug portion 38, according to a preferred embodiment of the present invention.

Referring now to FIG. 3, an upward looking view of the apparatus 10 depicting an access plug portion 38, according to the preferred embodiment of the present invention, is disclosed. The lower body collar 24 provides a threaded attachment thereto a large bottom access plug 38 via a female threaded region 25. The access plug 38 provides access thereinto the apparatus 10 for cleaning and maintenance. Said access plug 38 comprises a removably attachable round bottom surface approximately four (4) to six (6) inches in diameter and approximately one (1) inch thick being affixed thereto via standard male screw threads 42 located along an outer perimeter edge. Said access plug 38 is preferably made using PVC; however, equivalent plastic materials may be provided such as, but not limited to: CPVC, ABS, or the like. The access plug 38 provides a removal means via an integral access plug socket 40 comprising a square recessed area sized to receive a standard (½) half-inch ratchet tip, thereby allowing a user to remove said access plug 38 to clean out the apparatus 10 as needed.

A drain valve 82 is located along a bottom portion of the apparatus 10 and provides a means to drain contained liquids therefrom the body portion 20 for purposes of cleaning and maintenance. Said drain valve 82 is connected thereto the lower body collar 24 via a common PVC piping connection to convey said fluids therefrom. The drain valve 82 further comprises an integral drain orifice 124 providing a conventional threaded connection, thereby facilitating normal connection thereto subsequent piping or a hose to provide additional conveyance of said internal fluids.

Referring now to FIGS. 4a and 4b, a partial cut-away view and a close-up view of the body portion 20 of the apparatus 10, according to the preferred embodiment of the present invention, are disclosed. The apparatus 10 comprises a filter support feature 26, inlet piping 58, an elbow fitting 76, and a safety shield 86.

The cover 28 provides an attachment thereto the filter restraint 30 along an inside horizontal surface using a common fastener 32 such as a screw or rivet. Upon installation and latching of the cover 28, the filter element 50, as illustrated here, is secured vertically therebetween the restraint flange 31 and the filter support feature 26. The filter support feature 26 comprises an integrally-molded portion of the body 20 forming an annular horizontal shelf which protrudes inwardly approximately one-half (½) inch in a circular fashion acting as a sealing surface thereto the filter gasket 51.

The inlet piping 58 conveys a flow of fresh water thereinto the body 20 or may also supply a solution of water and liquid fertilizer 175 via utilization of the liquid chemical receptacle 100, as previously described. Said water/solution is conveyed via the inlet piping 58 which extends downwardly therefrom the tee fitting 78 subsequently penetrating and being routed therethrough the safety shield 48. The inlet piping 58 is mechanically supported therewithin the safety shield 38 via a pipe support 84 which provides protection from damage due to tensional forces applied thereto said inlet piping 58 during normal use. The pipe support 84 comprises a rigid plastic link which extends horizontally therefrom an adhesive or welded attachment thereto the body 20 to encompass an outer surface of said inlet piping 58. The inlet piping 58 further comprises a standard elbow fitting 76 and plumbing connection therewith the lower body collar 24, thereby providing conveyance of the aforementioned water/solution thereinto the body 20.

The safety shield 86 comprises a generally rectangular hollow housing protruding therefrom and being bonded thereto side surfaces of the body 20 and lower body collar 24 preferably using common adhesives. Said safety shield 86 is envisioned to be a molded or formed plastic enclosure envisioned being made using materials such as polycarbonate, PVC, CPVC, ABS, polypropylene, or the like. Said safety shield 86 provides an interior space suitable to enclose the inlet piping 58, thereby providing protection from possible impact damage thereto.

The inlet valve 80 and drain valve 82 comprise common flow regulating components such as a globe valve, a gate valve, a ball valve, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 to dispense a solution of water and liquid fertilizer 175 may be achieved by performing the following steps: installing a new filter element 50 by releasing the cover latches 34 therefrom the respective latching features 35; removing the cover 28 and inserting a new filter element 50 thereupon an end portion of the filter restraint 30 until contacting the restraint flange 31; shutting off the inlet valve 80; shutting off the drain valve 82; threadingly connecting the inlet orifice 120 to a water source 150 such as a hose; threadingly connecting the outlet orifice 122 thereto the sprinkler system 160; cleaning the gasket surfaces of the cover gasket 36, filter gasket 51, and filter support 26, if needed; installing the cover gasket 36 thereupon the upper body collar 22; replacing the cover 28 therewith the attached filter element 50 thereupon the upper body collar 22, thereby inserting the filter 50 thereinto the body 20 such that the filter gasket portion 51 rests thereupon the filter support feature 26; hooking wire portions of the four (4) cover latches 34 therearound the corresponding latching features 35; latching the cover latches 27; threadingly removing the liquid chemical cap 102, if adding a liquid fertilizer 175; pouring the desired amount of liquid fertilizer chemical 175 thereinto the liquid chemical receptacle 100; replacing the liquid chemical cap 102 thereonto the liquid chemical receptacle 100; initiating a flow of water therefrom the water source 150 based upon a desired output flow rate; opening the inlet valve 80 in a partial manner to dispense the liquid fertilizer 175 to produce a desired fertilizer solution concentration; communicating a water/fertilizer solution thereinto the lower part of the body 20 via the inlet piping 58; allowing said water/fertilizer solution to flow up through the filter 50, outlet piping 70, outlet orifice 122, and enter into the sprinkler system 160; dispensing a desired amount of water/liquid chemical mixture needed thereupon an area; shutting off the inlet valve 80; shutting off the water source 150.

The method of installing and utilizing the apparatus 10 to dispense a mixture of water and granulated fertilizer 170 may be achieved by performing the following alternate additional steps: removing the cover 28 and filter element 50 using the cover latches 34; pouring a desired amount of granulated fertilizer 170 thereinto the body 20 while being careful not to exceed the maximum fill line by observing the fill line indicia 54, 56; cleaning the gasket surfaces of the cover gasket 36, filter gasket 51, and filter support 26; installing the cover gasket 36 thereupon the upper body collar 22; replacing the cover 28 therewith the attached filter element 50 thereupon the upper body collar 22, thereby inserting the filter 50 thereinto the body 20 such that the filter gasket portion 51 rests thereupon the filter support feature 26; latching the cover latches 27; initiating a flow of water and dispensing water/fertilizer solution as previously described; and, benefiting from a portable, multi-type fertilizer mixing and dispensing means using the present invention 10.

The method of cleaning the apparatus 10 may be achieved by performing the following steps: shutting off and depressurizing the water source 150; opening the inlet valve 80 and drain valve 82; permitting any remaining water, water/fertilizer solution, and liquid fertilizer 175 within the apparatus 10 to drain downwardly; enabling a partial flow therefrom the water source 150; permitting water to flow through the inlet piping 58 and into the body 20, thereby mixing said water therewith any remaining granulated 170 or liquid 175 fertilizer; allowing said liquids to flow out the drain valve 82 thereinto an appropriate receptacle; allowing said flow to continue until only clear water is emitted therefrom; turning off the water source 150; releasing the cover latches 34; removing the cover 28 therewith the affixed filter restraint 30 and filter element 50; discarding the filter element 50 if spent; removing the cover gasket 36; removing the access plug 38; removing the liquid chemical cap 102; and, rinsing all of the parts of the apparatus 10 including the body 20 with fresh water from a suitable source such as a hose.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An in-line fertilizing and lawn care dispensing apparatus, comprising:
   a mixing chamber, further comprising:
      a body, comprising a cylindrical container with an open upper end and an open lower end and an interior;
      a upper body collar comprising a cylindrical reinforced section of an upper portion of said body;
      a lower body collar comprising a cylindrical reinforced section of a lower portion of said body;
      a filter support feature comprising an integrally-molded portion of said body forming an annular horizontal shelf along an inner surface;
      a cover providing a sealed connection with said upper body collar and a secure attachment means to said upper body collar; and,
      an access plug removably attached to said lower body collar, comprising an integral access plug socket;
   inlet piping, comprising an inlet proximal end in fluid communication therewith a water source and an inlet distal end in fluid communication therewith said mixing chamber; and,
   outlet piping, comprising an outlet proximal end in fluid communication therewith said mixing chamber and an outlet distal end in fluid communication therewith a downstream source;
   wherein said apparatus provides a means for automatic mixing and distributing of water and fertilizer, thereby producing a solution which may be subsequently supplied thereto said downstream source;
   wherein said cover provides access to an upper portion of said interior;
   wherein said access plug provides access to a lower portion of said interior;
   wherein said apparatus is selectively filled therewith a granular fertilizer; and,
   wherein said apparatus is selectively filled with a liquid fertilizer.

2. The apparatus of claim 1, wherein said sealed connection further comprises a step feature thereof said upper body collar providing a gasket surface therealong an open end portion thereof to receive a circular cover gasket thereof said cover when mated therewith.

3. The apparatus of claim 1, further comprising a maximum fill line imprinted thereon an outer peripheral surface thereof said body, denoted therewith indicia;
   wherein said maximum fill line indicates a maximum amount of granular fertilizer added therein said body.

4. The apparatus of claim 1, wherein said inlet proximal end and said outlet distal end each comprise a quick-disconnect attachment means thereto said water source and said downstream source, respectively.

5. The apparatus of claim 1, further comprising a liquid chemical receptacle comprising a removably attached liquid chemical cap at an upper end and an inlet valve at a lower end removably attached thereto and in fluid communication therewith said inlet piping between said inlet proximal end and said inlet distal end;
   wherein said liquid chemical receptacle receives a refillable amount of liquid fertilizer;
   wherein said liquid chemical receptacle provides a means to introduce a flow of said liquid fertilizer therein said inlet piping for subsequent mixing prior to introduction therein said body; and,
   wherein said inlet valve regulates said flow of liquid fertilizer thereinto said inlet piping.

6. The apparatus of claim 1, further comprising a replaceable filter element comprising a cylindrical-shaped unit having closed end portions, a filter media, a centrally-located filter aperture portion centrally located thereof a top surface thereof said filter element, a filter gasket affixed thereto a lower perimeter edge, and a liner along an outside surface to support said filter media;
   wherein said filter gasket provides a sealing means therewith said filter support feature; and,
   wherein said filter element provides fluid filtering of a fertilizer solution to remove any particulate matter therefrom and acts as a mechanical retention means thereto a contained volume of said granulated fertilizer therewithin said body.

7. The apparatus of claim 6, wherein said cover further comprises a filter restraint tube comprising a downwardly extending tubular element further comprising an integral restraint flange providing an attachment means thereto said filter aperture portion thereof said filter element;
   wherein said filter restraint tube provides a removable attachment thereto said filter element;
   wherein said restraint flange provides vertical positioning of said filter element; and, wherein said restraint flange provides a retention means thereof said filter element thereto said filter restraint tube.

8. The apparatus of claim 1, further comprising drain piping controlled by a drain valve located along a bottom portion thereof said lower body collar, comprising an attachment means to an exterior fluid transfer means;

wherein said drain piping and said drain valve provide a means to drain contained liquids therefrom said interior thereof said body.

9. The apparatus of claim 1, further comprising a safety shield comprising a generally rectangular hollow housing protruding therefrom and bonded thereto side surfaces of said body and said lower body collar, providing a routing means and a safety means therefor said inlet piping.

10. The apparatus of claim 9, further comprising a pipe support therefor said inlet piping, comprising a rigid link extending horizontally therefrom an exterior side surface thereof said body to encompass an outer surface of said inlet piping.

11. The apparatus of claim 1, wherein said body comprises a transparent or translucent composition, thereby providing visibility thereto a level of granulated fertilizer contained therewithin.

\* \* \* \* \*